(12) United States Patent  
Rieger et al.

(10) Patent No.: US 7,708,796 B2  
(45) Date of Patent: May 4, 2010

(54) AXIAL FLOW FILTER ELEMENT

(75) Inventors: Mario Rieger, Freiberg (DE); Werner Blossey, Benningen (DE)

(73) Assignee: Mann+Hummel GmbH, Ludwigsburg (DE)

( * ) Notice: Subject to any disclaimer, the term of this patent is extended or adjusted under 35 U.S.C. 154(b) by 310 days.

(21) Appl. No.: 11/754,655

(22) Filed: May 29, 2007

(65) Prior Publication Data

US 2007/0271886 A1     Nov. 29, 2007

(30) Foreign Application Priority Data

May 29, 2006    (DE)   ....................... 10 2006 025 235

(51) Int. Cl.
    *B01D 46/00*      (2006.01)
(52) U.S. Cl. .............................. 55/502; 55/498; 55/503; 55/521
(58) Field of Classification Search ................... 55/498, 55/502, 503, 520, 521
See application file for complete search history.

(56) References Cited

U.S. PATENT DOCUMENTS

| 4,410,427 | A | | 10/1983 | Wydeven | |
|---|---|---|---|---|---|
| 5,820,646 | A | * | 10/1998 | Gillingham et al. | ........... 55/488 |
| 6,517,598 | B2 | * | 2/2003 | Anderson et al. | .............. 55/498 |
| 6,610,126 | B2 | * | 8/2003 | Xu et al. | ......................... 95/273 |
| 6,797,028 | B2 | * | 9/2004 | Duffy | ......................... 55/385.2 |
| 6,878,190 | B1 | * | 4/2005 | Xu et al. | ......................... 95/273 |
| 6,966,940 | B2 | * | 11/2005 | Krisko et al. | .................... 55/497 |
| 6,997,968 | B2 | * | 2/2006 | Xu et al. | ......................... 55/495 |
| 7,323,030 | B2 | * | 1/2008 | Andersen et al. | .............. 55/502 |
| 7,396,375 | B2 | * | 7/2008 | Nepsund et al. | ............... 55/481 |
| 7,465,331 | B2 | * | 12/2008 | Noller | .......................... 55/523 |
| 7,491,254 | B2 | * | 2/2009 | Krisko et al. | .................... 55/337 |
| 2002/0185007 | A1 | | 12/2002 | Xu et al. | |
| 2007/0186528 | A1 | * | 8/2007 | Wydeven et al. | .............. 55/498 |

FOREIGN PATENT DOCUMENTS

| DE | 32 49 151 T1 | 1/1984 |
|---|---|---|
| WO | WO 2004/082795 A2 | 9/2004 |
| WO | WO 2006/093960 A2 | 9/2006 |

OTHER PUBLICATIONS

European Search Report dated Sep. 6, 2007 with English translation of relevant portion (Six (6) pages).

* cited by examiner

*Primary Examiner*—Michael A Marcheschi
*Assistant Examiner*—Robert A Clemente

(57) ABSTRACT

A filter element (1), which is formed particularly of a flat element wrapped into a compact body and which along its outer circumference has at least one continuous main sealing ring (2) disposed adjacent an end face (4) on the intake side, is provided with an additional emergency sealing collar (3) which encloses the filter body and is disposed near the end face (5) on the outlet side.

4 Claims, 2 Drawing Sheets

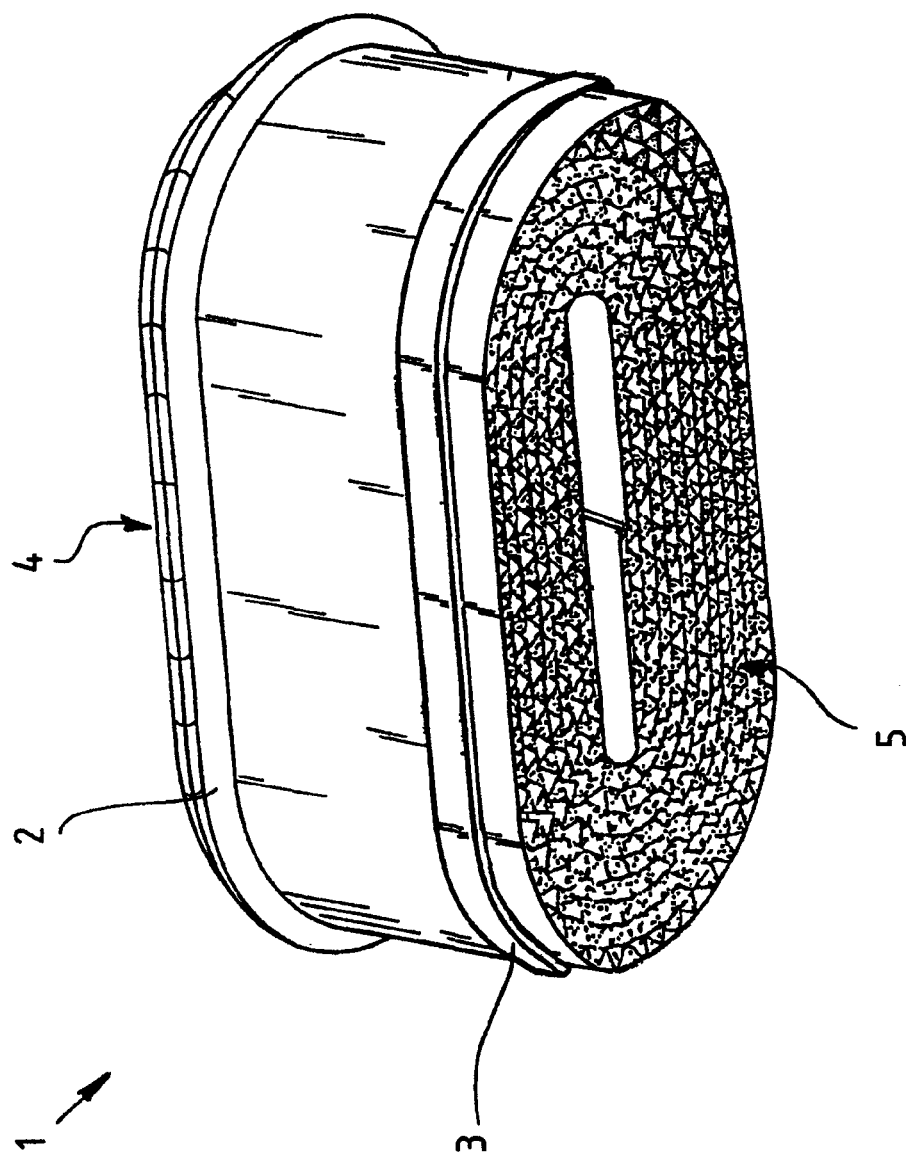

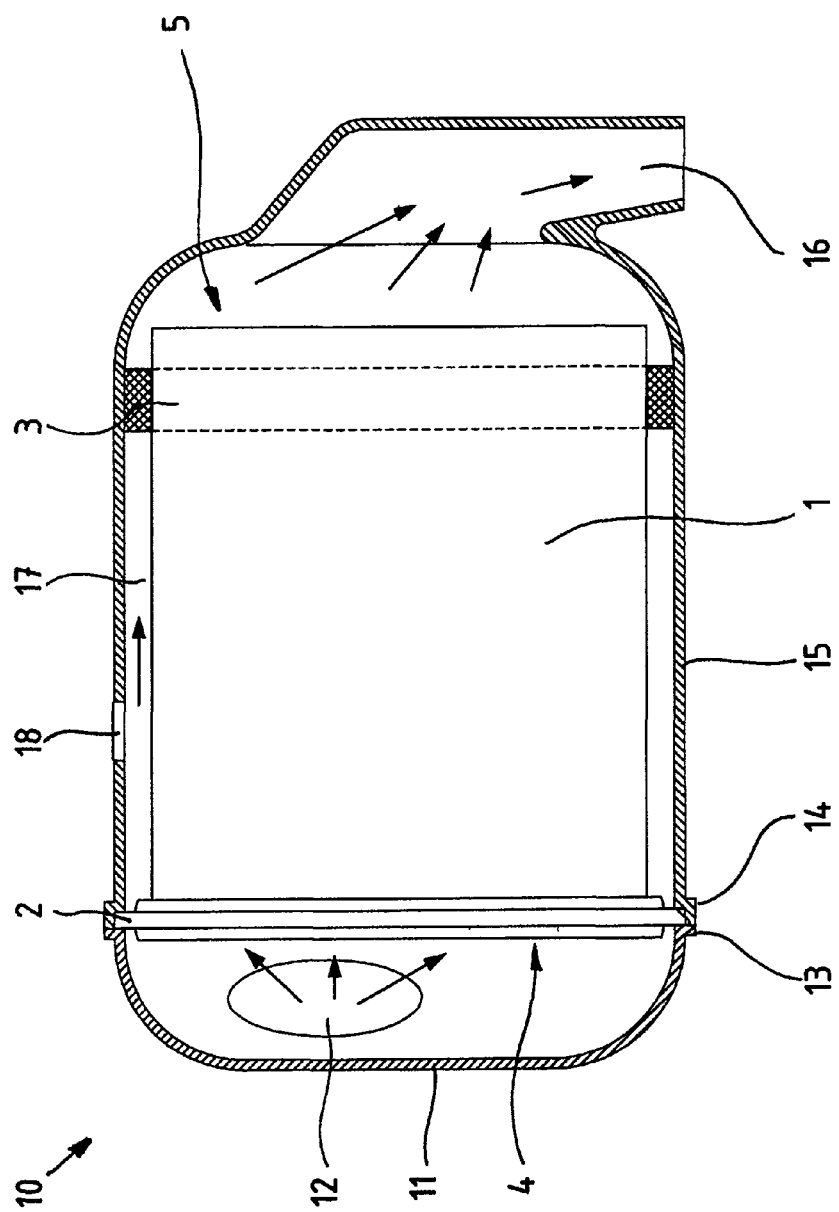

AXIAL FLOW FILTER ELEMENT

BACKGROUND OF THE INVENTION

The present invention relates to a filter element comprising at least one flat element wrapped into a compact body through which fluid to be filtered flows axially between its two axial end faces, and which has at least one continuous main sealing ring around its outer periphery arranged adjacent the end face on the intake side.

German Patent Publication No. DE 32 49 151 C2 discloses a compact air filter element. This filter element is formed of a corrugated or pleated filter paper and a smooth filter paper. The filter papers are bonded together and then tightly wrapped together to form a filter element of the desired size. Bonding is effected by applying bands of adhesive in the margin such that intervening spaces between the corrugated and the smooth layer are alternately closed at the two end faces to prevent direct flow through the channels formed between the filter papers. A fluid stream, particularly air taken in by an internal combustion engine and flowing from the unfiltered air side to the filtered air side flows initially only into a dead-end channel, then through the filter paper and out of a dead-end channel on the other side. Compared to conventional pleated filters, these compact air filters have the advantage of offering either a larger filter surface for the same overall size or the same filter surface in a smaller overall size.

In round filters in which the outer circumference is the intake side or the unfiltered air side, the outside air that is taken in must still pass the filter medium even if the filter housing is damaged. In axial flow filters, there is a problem that if a stone, for example, strikes and damages an external filter housing of a commercial vehicle or if a dropped tool damages the air filter housing, the filter element may be bypassed so that dirt-laden unfiltered air enters a downstream internal combustion engine. Because compact air filters usually have a circumferential sealing collar that is formed onto the body of the filter near an end face, by which the unfiltered air side is separated from the filtered air side, the major part of the length of the compact air filter element is located on the filtered side of the housing. If the housing is damaged, dirt can flow unhindered through the gap between the housing and the air filter element to the filtered air connection. This can damage the downstream consumer, such as an internal combustion engine.

SUMMARY OF THE INVENTION

It is therefore an object of the present invention to provide an improved axial flow filter element.

Another object of the invention is to provide an axial flow filter element which can prevent unfiltered air from bypassing the filter element if the air filter housing is damaged.

These and other objects are achieved in accordance with the present invention by providing a filter element comprising at least one flat element which is wrapped into a compact filter body, and through which fluid to be filtered can flow axially between an intake end face and an outlet end face, the filter element having at least one continuous main sealing ring disposed around its outer periphery adjacent the intake end face, and the filter element further comprising an emergency sealing collar enclosing the filter body adjacent the outlet end face.

Thus, according to the present invention an additional emergency sealing collar that circumferentially surrounds the air filter element and has a sufficient height to completely fill the gap between the compact air filter element and an inner housing wall of an air filter housing, is arranged near the outlet end of the filter spaced an axial distance from the main sealing ring. Preferably, the sealing collar may be disposed within the gap in such a way that it is slightly compressed in order to achieve a good sealing effect.

Another advantage is that the air filter element which is clamped at one end and is formed, for example, of a strip of nonwoven or foam material, is additionally supported relative to the housing by the emergency sealing collar. This reduces the mechanical loading of the air filter element, which according to the prior art is clamped at only one end, because the additional support at the other end substantially reduces the bending moments on the main sealing ring at the clamping point.

To achieve a thorough separation of particles at the emergency sealing collar in the event of damage to the filter housing, the porosity of the sealing collar is preferably selected to be equal to or even finer than the filter medium of the compact air filter element.

If, however, it is sufficient in an emergency to separate only large dirt particles, then relatively large-pore nonwoven filter webs or foams may be used. This has the advantage that the emergency sealing collar is semipermeable, and the outer surface of the compact air filter element is also available as a filter surface through which fluid can flow in normal operation.

Preferably, the filter element and its housing are matched to each other to form an air filter unit which ensures that the annular gap between the outside of the filter element and the inside of the housing is sealed completely both by the main sealing ring and by the emergency sealing ring.

BRIEF DESCRIPTION OF THE DRAWINGS

The invention will be described in further detail hereinafter with reference to illustrative preferred embodiments shown in the accompanying drawing figures, in which:

FIG. 1 is a perspective view of a filter element constructed in accordance with the present invention, and FIG. 2 is sectional view of an air filter unit with a compact air filter element according to the invention.

DETAILED DESCRIPTION OF PREFERRED EMBODIMENTS

FIG. 1 is a perspective view of an air filter element 1 constructed in accordance with the present invention. The view of outlet end face 5, which is located at the bottom of the drawing, shows that the filter element itself is formed of a wound filter medium. The interconnected corrugated or pleated layer and the smooth layer are clearly visible. In the illustrated embodiment, a wrapped core is provided in the center, which is sealed, so that there can be no direct flow from the intake end face 4 to the outlet end face 5.

Flow is possible only from the end face 4 into the channels formed between the corrugated layer and the smooth layer. These channels are closed at the end faces near alternating edges of successive layers, which means that the fluid flows from the end face 4 through the channels only up to just before the end face 5 and then must flow through the filter paper to reach a channel above or below it, which in turn is closed near the end face 4 and open toward the end face 5. An elastomeric or resilient sealing collar 2 is formed on the filter near the intake side.

According to the invention, an additional emergency collar 3 is applied or formed onto or adjacent the opposite axial end.

The mode of operation of this configuration will now be described with reference to FIG. 2. In an air filter unit 10 a pot-shaped housing 15 and a cap 11 form a closed housing, which has an inlet opening 12 and an outlet opening 16. The air filter element 1 is placed between the inlet and outlet openings 12, 16 and covers the entire cross-section of the opening within the housing. The pot-shaped housing 15 and the cap 11 each have a flange 13, 14 along their edge regions, which allows them to be coupled together on the one hand and also ensures that the collar-shaped main sealing ring 2a of the filter element 1 can be rigidly clamped between them. With this clamping, the main elastomer sealing ring 2 is compressed between the flanges 13, 14 so as to provide a gas-tight seal. Flow from the inlet opening 12 can enter the filter element 1 only at the end face 4, pass through the filter element and then flow from the end face 5 to the outlet opening 16. An annular gap 17 formed between the outer circumference of the filter element 1 and the inner circumference of the pot-shaped housing 15, is closed off by the main sealing ring 2.

If the housing is damaged downstream of the main sealing ring 2, i.e., in the area of the pot-shaped housing 15, so that a hole 18 is formed in the housing wall, then unfiltered air can flow into the annular gap 17. However, the annular gap 17 is closed off completely by the emergency collar 3 according to the invention, so that, depending on the porosity of the emergency collar 3, the flow is directed from the outside into the filter element 1 or is filtered directly by the porous emergency sealing collar.

In the illustrated embodiment, the emergency sealing collar 3 is shown as a simple ring with a rectangular cross section. More finely shaped profile forms are possible so as to adapt the collar to the inner contour of the housing of the air filter unit 10.

The illustration of FIG. 2 also shows that the filter element 1, because it is clamped at the main sealing ring 2 adjacent one axial end of the filter, cantilevers over almost its entire length inside the pot-shaped housing 15. Depending on the elastic stiffness of the elastic emergency collar 3, the emergency sealing collar 3 according to the invention supports the outlet end of the filter element and thereby reduces the bending moments occurring at the clamping point adjacent the inlet end.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A filter element located in a housing, the filter element comprising at least one flat element which is wrapped into a compact filter body, and through which fluid to be filtered can flow axially between an intake end face and an outlet end face, said filter element having at least one continuous main sealing ring disposed around its outer periphery adjacent the intake end face such that an annular gap formed between the outside of the filter element and the inside of the housing is closed by the main sealing ring, and said filter element further comprising an emergency sealing collar the filter applied onto and extending circumferentially around the outer periphery of the filter body in a position adjacent to the outlet end face such that said annular gap is also closed by the emergency sealing collar.

2. A filter element as claimed in claim 1, wherein the emergency sealing collar is formed of a nonwoven filter web.

3. A filter element as claimed in claim 1, wherein the emergency sealing collar is formed of a foam strip.

4. A filter element as claimed in claim 1, wherein the wrapped flat element comprises at least one layer of smooth filter paper and one layer of corrugated or pleated filter paper, and wherein the layers are interconnected by beads of viscous adhesive which are applied alternately to the edge regions of the layers.

\* \* \* \* \*